May 31, 1960 | I. MOLNAR | 2,938,955
IMPULSE CORRECTING REPEATER
Filed Oct. 16, 1956
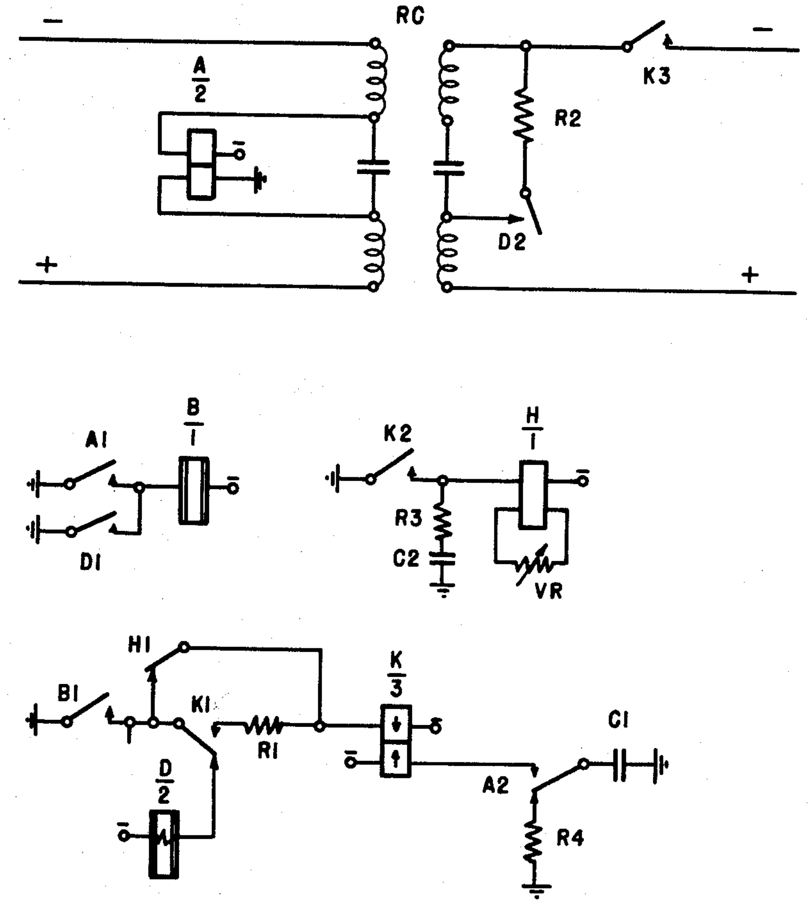
INVENTOR.
IMRE MOLNAR
BY Mc Walter Owen
ATTY.

United States Patent Office 2,938,955

Patented May 31, 1960

2,938,955

IMPULSE CORRECTING REPEATER

Imre Molnar, Chicago, Ill., assignor to General Telephone Laboratories, Incorporated, a corporation of Delaware Filed Oct. 16, 1956, Ser. No. 616,245

12 Claims. (Cl. 179—16)

The present invention relates to electrical signaling systems such as automatic telephone systems in which trains of impulses are utilized to effect the setting of automatic switches or the like and is particularly concerned with arrangements for overcoming the effects of distortion in the break-make ratio of incoming impulses comprising interruptions in a normally closed circuit. Such distortion, as is well-known, is due to the effect of the inductive and capacitative properties of the line on the responding line relay and may become very serious where long lines or a number of impulses repetitions are involved.

The chief object of the invention is to provide a simple and reliable arrangement for correcting for the effects of distortion and enabling the ratio of received impulses to be restored to its original or even a more desirable value.

Another object of the invention is the provision of an improved impulse correcting repeater in which the corrected outgoing impulse is accomplished by producing a substantially constant open period of approximately 58 milliseconds for each pulse, regardless of the closed or open periods of the incoming impulses and regardless of the voltage variations of a battery from 42 volts to 54 volts.

According to one feature of this invention, in an electrical signaling system employing trains of impulses comprising interruptions in a control circuit, an impulse repeater is provided in which incoming impulses are repeated at the proper speed with a ratio of break-to-make substantially independent of the ratio of the incoming impulses.

According to another feature of the invention, in an electrical signaling system employing trains of impulses comprising interruptions in a control circuit, an impulse repeater is provided in which the length of repeated interruptions is determined by the release of a slow-to-release relay and the operate time of a differential relay.

These and other objects of the invention will be apparent from the following specification taken in connection with the accompanying drawing which illustrates the well-known detached contacts in a well-known manner. For example, symbol $$\frac{A}{2}$$

designates that relay A has two contacts such as A1 and A2. Symbol $$\frac{K}{3}$$

designates that relay K has three contacts, namely K1, K2 and K3.

Referring generally to the drawing, the arrangement illustrated consists of an impulsing correcting circuit with connections to an incoming line for receiving impulses and connections to an outgoing line of transmitting corrected outgoing pulses.

Essentially, the impulse correcting equipment consists of a line relay A operated by incoming pulses, a differential impulse repeating relay K for repeating corrected outgoing pulses, a release relay B, a slow-to-release relay H having a variable resistor VR, of approximately 1500 ohms included in the circuit to its second winding for adjusting the release time of relay H, a holding circuit for the differential relay K including a high resistance R1 of approximately 1800 ohms, a condenser C1 of approximately 4 microfarads, a charging circuit for condenser C1 including one of the windings of approximately 500 ohms, of the differential relay K, and a discharge circuit for said condenser C1 including resistor R4 of approximately 200 ohms.

In considering the detailed operation of the system it will first be assumed that the circuit illustrated is to be used as a repeater in a telephone system and is seized over a trunk line from a distant telephone exchange. It is further assumed that the circuit is seized in any well-known manner over the positive and the negative line conductors of an incoming trunk line to complete a loop circuit for operating line relay A through the left hand windings of repeat coil RC. Upon operation, relay A closes contacts A1 to complete a circuit for release relay B, and at contacts A2 completes a charging circuit for condenser C1 through the lower winding of differential relay K. The charging current of condenser C1 flowing through the lower winding of relay K is not sufficient to operate relay K. Upon operation, relay B, at contacts B1 completes an operating circuit to differential relay K through normally closed contacts H1 and the upper winding of approximately 500 ohms of relay K to battery. Contacts B1 also completes a circuit for operating relay D over back contacts of relay K1. It is well-known that relay D operates and remains operated during the entire digit. This relay D helps relay B remain operated and shunts the right-hand winding of the repeat coil via D2 and R2 to improve pulsing. It is also well-known that relay D restores to normal after pulsing. Upon operation, relay K, at make contacts K1 closes a holding circuit for itself through contacts B1, K1, high resistance R1 and upper winding of relay K to battery, and at back contact K1 opens the circuit to slow-to-release relay D which is maintained operated during the pulsing period due to its slow release characteristics; at contacts K2 closes an operating circuit for relay H and a circuit for discharging condenser C2 of approximately .1 microfarad through resistance R3 of approximately 600 ohms; and at contacts K3 closes the outgoing loop impulsing circuit. The condenser C2 and resistance R3 connected in parallel with the operating winding of relay H are primarily used as a spark quencher for contacts K2 and also for assisting in retarding the release of relay H. Relay H having a primary winding of approximately 600 ohms and a secondary winding of approximately 250 ohms at contacts H1 opens the original energizing circuit of relay K and relay K is now held operated over its holding circuit including resistance R1.

Relay A restores for each received impulse, opens the charging circuit of condenser C1 through the lower winding of relay K, and discharges condenser C1 through resistance R4 at contacts A2. At contacts A1, relay A opens the original circuit to relay B but relay B, being slow-to-release is maintained operated until the connection is released. Relays B, D, K and H are now in operated position with relay K held operated over its holding circuit including its upper winding and high resistance R1, and line relay A is restored during the open period of the incoming impulse. No further operation takes place until line relay A is reoperated at the termination of the open period of the incoming impulse.

Upon termination of each incoming impulse, line relay A reoperates and at contacts A1 again closes the circuit to relay B to maintain relay B in operated position, and at contacts A2 again closes the charging circuit of condenser C1 through the lower winding of differential relay K. Current now flows in opposing directions through both windings of the differential relay K. It will be remembered that relay H has opened contacts H to open the original operating circuit for relay K and that relay K is being held operated by its holding circuit via its own contacts K1 and resistance R1. The high resistance R1 included in the holding circuit has reduced the current flow in the upper winding of relay K to a value substantially equal to that in the lower winding of relay K when the charging circuit for the condenser C1 is reclosed through the lower winding of relay K. Since the current in the upper winding of relay K is arranged to flow in one direction, while the current in the lower winding of relay K is arranged to flow in the opposite direction and since the value of the current flow of these two windings are substantially equal to each other at the time the condenser is charged in response to the reoperation of relay A, it, therefore, follows that the speedy release of the differential relay K is effected as soon as the line relay A reoperates.

Relay K, upon release, at contacts K1, opens its own holding circuit and recloses the circuit to relay D to maintain relay D operated during pulsing, at contacts K2 opens the operating circuit for relay H and causes condenser C2 to be charged through relay H and resistance R3; and at contacts K3, opens the outgoing pulse circuit. The release time of relay H is adjustable under control of the variable resistor VR after its energizing circuit is opened at contacts K2. Also, the charging of condenser C2 through the upper winding of relay H also momentarily sets up a current flow to assist in retarding the release of relay H. Since relay H is not immediately released, following the release of relay K, the operating circuit for relay K is held opened at contacts H1 during a short interval or for the release time of relay H. When relay H restores, in accordance with its adjusted time release period, contacts H1 again close the circuit for operating relay K over its upper winding. Relay K at contacts K3 again closes the outgoing pulse circuit, again operates relay H at contacts K2, and again closes its high resistance holding circuit at contacts K1. Thus the outgoing pulse circuit is opened at K3 until relay H is fully restored and relay K is thereby reoperated. As already pointed out, relay H has a variable release time depending upon the variable resistor VR which is set to produce a total pulse open period of approximately 58 milliseconds. The release time of H may be altered by varying resistance VR to vary the release time of relay H from 45 to 70 milliseconds. The open period of the outgoing impulse is dependent upon the release time of relay H which is substantially constant and requires only a short pulse of the make contacts of A2 to quickly force the release of relay K.

The reoperation of line relay A, on a closed period following an open period of an incoming pulse, initiates the open period of an outgoing pulse by causing the differential relay K to quickly restore. The restoration of relay K causes relay H to initiate its restoring operation which is timed by the associated variable resistor VR to restore after a predetermined time. As soon as relay H is fully restored, contacts H1 close to reoperate the differential relay to thereby terminate the open period of the outgoing pulse. The open period of the outgoing pulse is, therefore, determined by the release time of relay H and the operate time of relay K. Since the release time of relay H is fairly constant, it follows that the open period of the outgoing pulse is also fairly constant. In addition, it will be noted that the outgoing pulses are initiated in response to the reoperation of the line relay A and that the restoration of relay A does not control any repeating functions. As is well-known, the line relay A may be operated by varying incoming line conditions to produce a long operated period with a short restored period for each incoming pulse, or a short operated period with a long restored period for each incoming pulse. Since the outgoing pulses are initiated only in response to the reoperations of the line relay, and not by the restoration thereof, it follows that the ratio of the make to break periods of the incoming pulses have very little effect on the outgoing pulses, with the result that the outgoing pulses are transmitted with the correct make to break ratio.

Upon the termination of the call, line relay A restores in a well-known manner. Upon restoration, relay A, at contacts A1, opens the operating circuit for relay B, and at contacts A2, opens the circuit to the lower winding of relay K. After a short interval, relay B falls back. Upon restoration, relay B, at contacts B1, opens the circuit to relay D, and also at contacts B1, opens the circuit to relay K. Relays A, B, K, H, are now restored to normal.

Having fully described the features and aspects of my invention, what I consider to be new will be pointed out in the appended claims.

What is claimed is:

1. In an impulse correcting repeater, a line relay, a line circuit, an outgoing pulsing circuit, said line relay operated by closure of said line circuit and restored by subsequent breaks in said line circuit, a first relay operated responsive to the first operation of said line relay, a differential relay, an operating circuit for said differential relay completed responsive to the operation of said first relay, pulsing contacts on said differential relay closed responsive to the operation of said differential relay to complete said outgoing pulsing circuit in response to each completion of said operating circuit, a holding circuit for said differential relay, holding contacts operated by said differential relay for preparing said holding circuit in response to each operation of said differential relay, a slow-to-release relay having a predetermined release time, a circuit for operating said slow relay, control contacts operated by said differential relay for completing said slow relay circuit each time said differential relay is operated, time contacts operated by said slow relay for opening said differential relay operating circuit and for substituting said holding circuit, a second circuit for said differential relay, contacts operated by said line relay on each subsequent reoperation thereof for completing said second circuit, the current flow in said second circuit being in opposition to the current flow in said holding circuit to thereby cause said differential relay to quickly restore, said control contacts restored by each restoration of said differential relay for initiating the release of said slow relay, said pulsing contacts opened responsive to each restoration of said differential relay for opening said outgoing pulsing circuit, said holding contacts restored by the restoration of said differential relay for opening said holding circuit, and said timing contacts restored in response to each complete restoration of said slow relay to again complete said operating circuit to reoperate said differential relay to again close said outgoing pulsing circuit.

2. In an impulse correcting repeater as claimed in claim 1 wherein said operating circuit of said differential relay includes a first winding, said holding circuit includes a high resistance and said first winding, and said second circuit includes a second winding of said differential relay and a condenser momentarily charged through said second winding in response to each reoperation of said line relay contacts.

3. An impulse repeater comprising incoming and outgoing connections, means for seizing said repeater over said incoming connections, a line relay in said repeater operated by the seizure of said repeater and restored and reoperated by impulses transmitted over said incoming connections, a differential relay having two windings, a first slow-to-release relay operated by the operation of said line relay, a second slow-to-release relay, a first circuit including contacts on said first slow relay and contacts on said second slow relay completed by the operation of said first slow relay for initially operating said differential relay over one of its windings, a second circuit including contacts on said differential relay completed for operating said second slow relay responsive to the operation of said differential relay, said first circuit being opened by said contacts on said second slow relay responsive to the operation of said second slow relay, a holding circuit including said one winding of said differential relay and a high resistance effective in response to the operation of said second slow relay and the opening of said first circuit for maintaining said differential relay operated, a condenser connected to a second winding of said differential relay and charged through said second winding responsive to a reoperation of said line relay whereby the current flow in said one winding in said holding circuit opposes the current flow in said second winding to quickly restore said differential relay, said second circuit being opened by said contacts on said differential relay responsive to the restoration of said differential relay to thereby restore said second slow relay, said contacts on said second slow relay again completing said first circuit in response to the restoration of said second slow relay to again operate said differential relay, pulsing contacts on said differential relay for transmitting corrected outgoing impulses over said outgoing connections, the make and break ratio of said outgoing impulses being determined solely by the release time of said second slow relay and the operate time of said differential relay.

4. In an impulse correcting repeater arranged to receive incoming impulses, each of said incoming impulses having a make and a break period, a line relay operated during each make period and restored during each break period of said incoming impulses, an adjustable slow-to-release relay, a differential relay, a first circuit including contacts on said adjustable slow relay completed for operating said differential relay over one winding of said differential relay responsive to the initial operation of said line relay, a second circuit including contacts on said differential relay and completed for operating said slow relay each time said differential relay is operated, a locking circuit including a high resistance for maintaining said differential relay operated and effective each time said slow relay is operated to open said first circuit, a condenser connected to another winding of said differential relay and charged through said other winding responsive to the operation of said line relay, the current flow through said one winding in said locking circuit opposing the current flow in said other winding to quickly restore said differential relay at the beginning of each make period, said second circuit being opened by said contacts on said differential relay to initiate the restoring operation of said slow relay, said differential relay being again operated over said first circuit in response to the restoration of said slow relay, pulsing contacts on said differential relay operated by the operations and restorations of said differential relay for transmitting corrected outgoing impulses having a break period determined by the release time of said slow relay and the operate time of said differential relay.

5. An impulse correcting repeater comprising a differential relay having a first and a second winding, a first operating circuit for operating said differential relay over its first winding, a holding circuit for said differential relay including said first winding and a high resistance, means for closing said holding circuit to hold said differential relay operated after said first operating circuit is opened, means for opening said first operating circuit and for substituting said holding circuit to reduce current flow in said first winding, a condenser, means for charging said condenser through said second winding of said differential relay for establishing a current flow in said second winding in a direction opposite and substantially equal to the current flow in said first winding in said holding circuit to thereby release said differential relay.

6. In an impulse correcting repeater arranged to receive series of impulses and transmit corrected series of outgoing impulses, a differential relay, an adjustable slow relay operated by said differential relay, said differential relay having two windings, an operating circuit for said differential relay including one of said windings controlled by said slow relay, means controlled jointly by the operation of said slow relay and the other winding of said differential relay for quickly releasing said differential relay, and means for delaying the release of said slow relay after release of said differential relay to thereby maintain the operating circuit to said differential relay open for a predetermined short interval.

7. In an impulse correcting repeater, a line relay responsive to received impulses comprising breaks and makes in an incoming circuit, an outgoing circuit, a differential relay and a slow relay, said differential relay having a first operating circuit controlled by said slow relay, means responsive to the initial operation of said line relay for completing said operating circuit, pulsing contacts on said differential relay for transmitting outgoing pulses over said outgoing circuit, a second operating circuit completed by the operation of said differential relay for operating said slow relay, a condenser having a charging circuit, means responsive to a subsequent operation of said line relay for connecting said charging circuit to said differential relay for quickly restoring said differential relay, means responsive to said release of said differential relay for opening said second operating circuit to release said slow relay, and means for delaying the release of said slow relay to maintain said first operating circuit open for a time interval to time the break period of an outgoing pulse transmitted over said outgoing circuit.

8. In an impulse correcting repeater comprising input and output circuits for transmitting trains of impulses having break and make periods, a differential relay, a first means for initially operating said differential relay in response to the seizure of said input circuit, a slow relay, a second means operated in response to each operation of said differential relay for operating said slow relay, a condenser connected to a source of current through a winding of said differential relay for charging said condenser during each subsequent make period of said input circuit, means jointly controlled by the operated condition of said slow relay and the charging of said condenser for releasing said differential relay, said second means controlled by the release of said differential relay for initiating the release of said slow relay, a variable resistor included in a circuit for timing the release of said slow relay when said differential relay is released, said first means reoperating said differential relay in response to each make period of said input circuit following a break period of an incoming impulse, means on said differential relay for repeating impulses over said output circuit corresponding to incoming impulses received over said input circuit, said repeated impulses having a break period dependent upon the release time of said slow relay to transmit outgoing impulses having a desired break to make ratio.

9. In an impulse correcting repeater comprising a differential relay having a first and a second winding, an operating circuit for operating said differential relay over its first winding, a holding circuit for said differential relay completed by said differential relay, a high resistance included in said holding circuit for reducing the current flow in said first winding when said operating circuit is opened, means for closing said holding circuit to thereby establish a current flow through said first winding in one direction to hold said differential relay operated after said operating circuit is opened, a condenser, pulsing means for charging said condenser through said second winding, the current flow through said second winding during the charging of said condenser being insufficient to release said differential relay while said operating circuit is closed, and means for opening said operating circuit whereby the current flow through said second winding during the charging of said condenser is in a direction opposite and substantially equal to the current flow through said first winding over said holding circuit after said operating circuit is opened to thereby accelerate the release of said differential relay.

10. In an impulse correcting repeater as claimed in claim 9 including a discharge circuit for discharging said condenser, said pulsing means closing said discharge circuit for causing said condenser to be discharged on each open period of an incoming impulse, and said pulsing means again charging said condenser after its discharge on each closed period of an incoming impulse to again establish a current flow in said second winding to again accelerate the release of said differential relay.

11. In an impulse correcting repeater comprising incoming and outgoing connections, means for seizing said repeater over said incoming connections, a line relay in said repeater operated by the seizure of said repeater and restored and reoperated by impulses transmitted over said incoming connections, a differential relay having two windings, a first and second slow-to-release relay, means for operating said first slow relay responsive to the operation of said line relay, a first circuit including operated contacts on said first slow relay and contacts on said second slow relay completed for initially operating said differential relay through the first of said windings, a second circuit including contacts on said differential relay completed for operating said second slow relay responsive to the operation of said differential relay, said first circuit being opened responsive to the operation of said contacts on said second slow relay, a holding circuit including a high resistance and said first winding completed by said differential relay for maintaining said differential relay operated, a condenser having a charging circuit connected to said differential relay and charged through the second winding of said differential relay responsive to a reoperation of said line relay for quickly restoring said differential relay, said second circuit opened responsive to the restoration of said differential relay thereby to deenergize said second slow relay and recomplete said first circuit to again operate said differential relay, and pulsing contacts on said differential relay for transmitting corrected outgoing impulses determined by the release time of said second slow relay and the operate time of said differential relay.

12. In an impulses correcting repeater as claimed in claim 11 including a discharge circuit for discharging said condenser, pulsing means responsive to the restoration of said line relay for closing said discharge circuit to discharge said condenser and said last mentioned pulsing means responsive to a reoperation of said line relay again closing said condenser charging circuit to reestablish a current flow in said second winding substantially equal to the current flow in said holding circuit through said first winding to again accelerate the release of said differential relay.

References Cited in the file of this patent

UNITED STATES PATENTS

| | | |
|---|---|---|
| 2,154,624 | Kinkead | Apr. 18, 1939 |
| 2,301,523 | Clay | Nov. 10, 1942 |
| 2,552,780 | Hadfield | May 15, 1951 |
| 2,747,018 | Dahlman | May 22, 1956 |